United States Patent [19]

Brezinski

[11] Patent Number: 5,756,004
[45] Date of Patent: May 26, 1998

US005756004A

[54] QUATERNARY AMMONIUM COMPOUNDS USEFUL FOR INHIBITING METAL CORROSION

[75] Inventor: Michael M. Brezinski, The Hague, Netherlands

[73] Assignee: Halliburton Energy Services, Inc., Duncan, Okla.

[21] Appl. No.: 855,049

[22] Filed: May 13, 1997

[51] Int. Cl.⁶ .............................. C09K 7/00; C23F 11/04
[52] U.S. Cl. .................. 252/394; 166/305.1; 166/307; 166/308; 252/389.23; 252/390; 252/392; 422/12; 507/116; 507/130; 507/218; 507/240; 507/242; 507/243; 507/260; 507/922; 507/923; 507/933; 507/934; 507/939
[58] Field of Search ................... 252/389.23, 390, 252/392, 394; 166/305.1, 307, 308; 422/12; 507/116, 130, 218, 240, 242, 243, 260, 922, 923, 933, 934, 939

[56] References Cited

U.S. PATENT DOCUMENTS

| H751 | 3/1990 | Sullivan et al. | 252/8.553 |
|---|---|---|---|
| 2,758,970 | 8/1956 | Sankaitis et al. | 252/8.55 |
| 4,498,997 | 2/1985 | Walker | 252/8.55 C |
| 4,552,672 | 11/1985 | Walker | 252/8.55 C |
| 4,698,168 | 10/1987 | Briggs | 252/8.553 |
| 5,366,643 | 11/1994 | Walker | 252/8.555 |
| 5,441,929 | 8/1995 | Walker | 507/260 |

*Primary Examiner*—Peter O'Sullivan

[57] ABSTRACT

The present invention provides improved quaternary ammonium compounds useful as metal corrosion inhibitors in aqueous acid solutions, methods of preparing the compounds, metal corrosion inhibited aqueous acid solutions containing the compounds and methods of protecting metal surfaces from acid corrosion using the compounds. The compounds are prepared by contacting the still bottoms residue produced in the distillation of quinoline from coal tar with oxygen to oligomerize aromatic amines contained therein and then reacting the oligomerized amines with a benzylhalide.

22 Claims, No Drawings

QUATERNARY AMMONIUM COMPOUNDS USEFUL FOR INHIBITING METAL CORROSION

BACKGROUND OF THE INVENTION

1. Field of the Invention

The present invention relates to improved quaternary ammonium compounds useful as metal corrosion inhibitors in aqueous acid solutions and methods of preparing and using such compounds.

2. Description of the Prior Art

Subterranean hydrocarbon containing formations penetrated by well bores are commonly treated with aqueous acid solutions to stimulate the production of hydrocarbons therefrom. One such treatment known as "acidizing" involves the introduction of an aqueous acid solution into the subterranean formation under pressure so that the acid solution flows through the pore spaces of the formation. The acid solution reacts with acid soluble materials contained in the formation thereby increasing the size of the pore spaces and the permeability of the formation. Another production stimulation treatment known as "fracture-acidizing" involves the formation of one or more fractures in the formation and the introduction of an aqueous acid solution into the fractures to etch the fracture faces whereby flow channels are formed when the fractures close. The aqueous acid solution also enlarges the pore spaces in the fracture faces in the formation.

In carrying out acidizing and fracture-acidizing treatments in wells and other similar treatments using aqueous acid solutions, the corrosion of metal tubular goods, pumps and other equipment is often a problem. The expense associated with repairing or replacing corrosion damaged tubular goods and equipment can be very high. In a well treatment utilizing an aqueous acid solution, the corrosion of metal surfaces in tubular goods and equipment results in at least the partial neutralization of the aqueous acid solution before it reacts with acid-soluble materials in the subterranean formation to be treated. Also, the presence of dissolved metals in the aqueous acid solution can bring about the precipitation of insoluble sludge when the aqueous acid solution contacts crude oil which can in turn severely damage the permeability of the subterranean formation being treated.

A variety of metal corrosion inhibiting formulations for use in aqueous acid solutions have been developed and used successfully heretofore. Many of such corrosion inhibiting formulations have included quaternary ammonium compounds as essential components, particularly in high temperature applications. It has been found that the metal corrosion inhibiting ability of a quaternary ammonium compound often increases as the molecular weight and/or degree of aromaticity of the compound increases. For example, a quaternary ammonium compound having three aromatic rings prepared by reacting quinoline with a benzylhalide functions very well as a metal corrosion inhibitor in aqueous acid solutions. When quinoline is reacted with a naphthalene compound such as chloromethyl naphthalene to form a quaternary ammonium compound having four aromatic rings, the quaternary ammonium compound functions better as a metal corrosion inhibitor in aqueous acid solutions. When quinoline is reacted with acridine to form a quaternary ammonium compound having five aromatic rings, the quaternary ammonium compound functions even better as a metal corrosion inhibitor in aqueous acid solutions. However, the aromatic quaternary compounds described above are very expensive to produce, and therefore are impractical for use as metal corrosion inhibitors.

Thus, there is a need for improved quaternary ammonium compounds for use as metal corrosion inhibitors in aqueous acid solutions which have high molecular weights and high degrees of aromaticity and are relatively inexpensive to prepare.

SUMMARY OF THE INVENTION

By the present invention improved quaternary ammonium compounds useful as metal corrosion inhibitors in aqueous acid solutions, methods of inexpensively preparing a mixture of such compounds, aqueous acid solutions containing the compounds and methods of using the compounds are provided which meet the needs described above and overcome the deficiencies of the prior art. The improved quaternary ammonium compounds have high molecular weights and high degrees of aromaticity. When added to an aqueous acid solution, a metal corrosion inhibitor comprised of a mixture of the improved quaternary ammonium compounds provides exceptional metal corrosion protection.

A mixture of the improved quaternary ammonium compounds of this invention is inexpensively prepared by contacting the still bottoms residue produced in the distillation of quinoline from coal tar with oxygen in the presence of a catalyst at a temperature and for a time sufficient to oligomerize aromatic amines contained therein, and then reacting the bottoms residue containing oligomerized amines with a benzylhalide at a temperature and for a time sufficient to form the quaternary ammonium compounds.

Metal corrosion inhibited aqueous acid solutions of this invention are basically comprised of water, an acid and an effective amount of a corrosion inhibitor comprised of a mixture of quaternary ammonium compounds prepared as described above. The acid utilized in the aqueous acid solutions is preferably selected from the group consisting of hydrochloric acid, hydrofluoric acid, formic acid, acetic acid, citric acid and mixtures thereof.

The methods of this invention for protecting a metal surface from corrosion when contacted by an aqueous acid solution are basically comprised of the steps of combining with the aqueous acid solution an effective amount of a corrosion inhibitor comprising a mixture of quaternary ammonium compounds prepared as described above, and then contacting the metal surface with the aqueous acid solution containing the corrosion inhibitor.

Thus, it is a general object of the present invention to provide improved quaternary ammonium compounds useful as metal corrosion inhibitors in aqueous acid solutions, methods of preparing the compounds, metal corrosion inhibited aqueous acid solutions containing the compounds and methods of protecting metal surfaces from corrosion when contacted by aqueous acid solutions using the compounds.

Other and further objects, features and advantages of the present invention will be readily apparent to those skilled in the art upon a reading of the description of preferred embodiments which follows.

DESCRIPTION OF PREFERRED EMBODIMENTS

The present invention provides improved quaternary ammonium compounds having high molecular weights and high degrees of aromaticity and methods of preparing a metal corrosion inhibitor for use in aqueous acid solutions comprised of a mixture of such compounds. Corrosion inhibited aqueous acid solutions containing the quaternary ammonium compounds are also provided as well as methods of protecting metal surfaces from corrosion when contacted by an aqueous acid solution using the compounds.

The quaternary ammonium compounds of this invention are inexpensively prepared from the still bottoms residue produced in the distillation of pharmaceutical quinoline from coal tar. Such still bottoms residue contains quantities of quinoline and derivatives thereof, isoquinoline and derivatives thereof, and other aromatic amine compounds such as pyridine, picoline, lutidine and the like. The quinoline still bottoms residue starting material is commercially available, for example, from the Crowley Coal Tar Products Company of New York, N.Y., under the tradename "INHIBITOR J™."

A quantity of the still bottoms residue is contacted with oxygen in the presence of a catalyst, e.g., cuprous chloride in an amount in the range of from about 0.1% to about 2% by weight of the bottoms residue, at a temperature and for a time sufficient to oligomerize the aromatic amines contained therein. It is believed that the contact with oxygen causes a coupling reaction that oligomerizes the aromatic amines and thereby increases their overall molecular weights and degrees of aromaticity. The term "oligomerize" is used herein to mean the coupling of several aromatic amines together and/or to other aromatic compounds. The contact of the still bottoms residue with oxygen is preferably carried out by sparging oxygen or air through the bottoms residue at a rate of from about 2 to about 30 cubic centimeters per minute per 100 milliliters of bottoms residue for a time period in the range of from about 8 hours to about 48 hours while maintaining the temperature of the bottoms residue in the range of from about 150° F. to about 225° F.

The mixture of oligomerized aromatic amines produced by contacting the still bottoms residue with oxygen are reacted with a benzylhalide such as benzylchloride at a temperature and for a time sufficient to form a mixture of high molecular weight and aromaticity quaternary ammonium compounds therefrom. Generally, the amount of benzylhalide reacted with the oligomerized bottoms residue is in the range of from about 70% to about 100% by weight of the bottoms residue. The reaction is carried out at a temperature in the range of from about 150° F. to about 225° F. for a time of from about 8 hours to about 48 hours, or until the reaction mixture turns from a brown color to a scarlet-red color.

As mentioned above, the mixture of quaternary ammonium compounds prepared as described above are highly active and function extremely well as metal corrosion inhibitors in aqueous acid solutions.

The improved metal corrosion inhibited aqueous acid solutions of this invention are comprised of water, an acid, and an effective amount of a metal corrosion inhibitor comprised of the highly active mixture of quaternary ammonium compounds prepared from quinoline still bottoms residue as described above.

The water used to form the aqueous acid solutions of this invention can be any aqueous fluid which does not adversely react with the components of the inhibited aqueous acid solution. For example, the water can be fresh water, brine, salt solutions and the like.

The acid utilized is preferably an acid selected from the group consisting of hydrochloric acid, hydrofluoric acid, formic acid, acetic acid, citric acid and mixtures thereof. The acid is preferably present in an amount in the range of from about 2% to about 100% by weight of the acid solution, more preferably from about 5% to about 38%.

The metal corrosion inhibitor comprised of a mixture of quaternary ammonium compounds prepared as described above is present in the aqueous acid solution in an amount effective to prevent or reduce the corrosion of metal surfaces contacted by the acid solution. Preferably the corrosion inhibitor is present in an amount in the range of from about 0.05% to about 3% by volume of the solution.

As will be understood by those skilled in the art, the metal corrosion inhibited aqueous acid solutions of this invention can include a variety of other additives such as acetylenic alcohols, various corrosion inhibitor intensifiers, sulfide scavengers, solvents, surfactants and other components commonly used in acidizing compositions and known to those skilled in the art.

The methods of this invention for protecting a metal surface from corrosion when contacted by an aqueous acid solution are basically comprised of the steps of combining an effective amount of a metal corrosion inhibitor comprised of a mixture of quaternary ammonium compounds prepared as described above with the aqueous acid solution, and then contacting the metal surface with the aqueous acid solution containing the corrosion inhibitor.

While the metal corrosion inhibitor comprised of a mixture of improved quaternary ammonium compounds of this invention can be combined with any aqueous acid solution used in any application to contact and dissolve reactive materials so that metal surfaces also contacted by the acid solution are prevented from being corroded, the corrosion inhibitor is particularly suitable for use in aqueous acid solutions used for acidizing and fracture-acidizing subterranean formations.

In order to further illustrate the aqueous acid compositions and methods of this invention the following example is given.

EXAMPLE 1

A corrosion inhibitor comprised of a mixture of improved quaternary ammonium compounds of this invention was prepared by contacting 100 milliliters of quinoline still bottoms residue containing 1% by weight cuprous chloride with oxygen at a rate of 20 cubic centimeters per minute for 24 hours and at a temperature of 175° F. The still bottoms residue used was obtained from the Crowley Coal Tar Products Company under the tradename "INHIBITOR J™." The resulting mixture of oligomerized aromatic amines were then reacted with 92 milliliters of benzylchloride in isopropyl alcohol for 8 hours at a temperature of 225° F. A portion of the resulting mixture of quaternary ammonium compounds was combined with other components to form a first corrosion inhibiting formulation (designated as "Inhibitor A") as follows:

| Inhibitor A | |
| --- | --- |
| Component | Amount, % by weight of formulation |
| surfactants | 18 |
| acetylenic alcohols | 5 |
| solvents (alcohols and naphtha) | 30 |
| fatty acids | 30 |
| quaternary ammonium compound mixture formed from oxygen treated quinoline still bottoms residue | 17 |
| | 100 |

A second corrosion inhibitor was prepared as described above except that the quinoline still bottoms residue was reacted directly with the benzylchloride without first being contacted with oxygen. Sufficient cuprous chloride was then added to the reaction product to equal 1% (wt) with respect to the still bottom residue component. This resulting mixture was combined with the same components to form a second corrosion inhibitor formulation (designated as "Inhibitor B") as follows:

| Inhibitor B | |
|---|---|
| Component | Amount, % by weight of formulation |
| surfactants | 18 |
| acetylenic alcohols | 5 |
| solvents (alcohols and naphtha) | 30 |
| fatty acids | 30 |
| quaternary ammonium compound mixture formed directly fom quinoline still bottoms residue | 17 |
| | 100 |

0.3 milliliter portions of Inhibitor A and Inhibitor B were combined with 100 milliliter portions of a 15% by weight aqueous hydrochloric acid solution containing 2% by weight of an ethoxylated amine dispersant and 2% by weight of an antisludging formulation containing dodecylbenzene sulfonic acid.

The resulting corrosion inhibited test samples were heated to 200° F., and a preweighed N-80 steel corrosion coupon was immersed in each while maintaining the temperature of the samples for 4 hours. After the four hour test periods, the corrosion coupons were removed, rinsed and weighed to determine the rates of corrosion which took place during the tests.

The results of the tests were as follows:

| Test Sample containing: | Corrosion Rate, pounds per square foot |
|---|---|
| Inhibitor A | 0.003 |
| Inhibitor B | 0.023 |

From the above test results, it can be seen that the corrosion inhibitor of the present invention provides excellent corrosion protection.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of preparing a mixture comprised of quaternary ammonium compounds useful as a metal corrosion inhibitor in aqueous acid solutions comprising the steps of:
   (a) contacting the still bottoms residue produced in the distillation of quinoline from coal tar with oxygen in the presence of a catalyst at a temperature and for a time sufficient to oligomerize aromatic amines contained therein; and
   (b) reacting said bottoms residue containing oligomerized amines with a benzylhalide at a temperature and for a time sufficient to form said mixture of quaternary ammonium compounds.

2. The method of claim 1 wherein said catalyst utilized in step (a) is cuprous chloride present in said bottoms residue in an amount in the range of from about 0.1% to about 2% by weight of said bottoms residue.

3. The method of claim 2 wherein said bottoms residue is contacted with said oxygen in accordance with step (a) at a rate of from about 2 to about 30 cubic centimeters per minute per 100 milliliters of bottoms residue.

4. The method of claim 3 wherein said bottoms residue is contacted with said oxygen or air in accordance with step (a) at a temperature in the range of from about 150° F. to about 225° F.

5. The method of claim 4 wherein said bottoms residue is contacted with said oxygen in accordance with step (a) for a time period in the range of from about 8 hours to about 48 hours.

6. The method of claim 1 wherein said bottoms residue containing oligomerized amines is reacted in accordance with step (b) with an amount of benzylhalide in the range of from about 70% to about 100% by weight of said bottoms residue.

7. The method of claim 6 wherein said bottoms residue containing oligomerized amines is reacted with said benzylhalide in accordance with step (b) at a temperature in the range of from about 150° F. to about 225° F.

8. The method of claim 1 wherein said benzylhalide is benzylchloride.

9. A metal corrosion inhibitor for use in aqueous acid solutions comprising a mixture of quaternary ammonium compounds prepared in accordance with the method of claim 1.

10. A metal corrosion inhibitor for use in aqueous acid solutions comprising a mixture of quaternary ammonium compounds prepared in accordance with the method of claim 5.

11. A metal corrosion inhibited aqueous acid solution comprised of:
   water;
   an acid; and
   an effective amount of a metal corrosion inhibitor comprising a mixture of quaternary ammonium compounds prepared by contacting the still bottoms residue produced in the distillation of quinoline from coal tar with oxygen in the presence of a catalyst at a temperature and for a time sufficient to oligomerize aromatic amines contained therein, and then reacting said bottoms residue containing oligomerized amines with a benzylhalide at a temperature and for a time sufficient to form said mixture of quaternary ammonium compounds.

12. The metal corrosion inhibited aqueous acid solution of claim 11 wherein said acid is selected from the group consisting of hydrochloric acid, hydrofluoric acid, formic acid, acetic acid, citric acid and mixtures thereof, and is present in said aqueous acid solution in an amount in the range of from about 2% to about 100% by weight of water in said solution.

13. The metal corrosion inhibited aqueous acid solution of claim 12 wherein said corrosion inhibitor is present therein in an amount in the range of from about 0.05% to about 3% by volume of said solution.

14. The metal corrosion inhibited aqueous acid solution of claim 11 wherein said catalyst is cuprous chloride present in said bottoms residue in an amount in the range of from about 0.1% to about 2% by weight of said bottoms residue.

15. The metal corrosion inhibited aqueous acid solution of claim 11 wherein said bottoms residue is contacted with said oxygen at a rate in the range of from about 2 to about 30 cubic centimeters per minute per 100 milliliters of bottoms residue at a temperature in the range of from about 150° F. to about 225° F. and for a time period in the range of from about 8 hours to about 48 hours.

16. The metal corrosion inhibited aqueous acid solution of claim 15 wherein said bottoms residue containing oligomerized amines is reacted with said benzylhalide in an amount in the range of from about 70% to about 100% by weight of said bottoms residue at a temperature in the range of from about 150° F. to about 225° F. for a time period in the range of from about 8 hours to about 48 hours.

17. A method of protecting a metal surface from corrosion when contacted by an aqueous acid solution comprising the steps of:

combining with said aqueous acid solution an effective amount of a metal corrosion inhibitor comprising a mixture of quaternary ammonium compounds prepared by contacting the still bottoms residue produced in the distillation of quinoline from coal tar with oxygen in the presence of a catalyst at a temperature and for a time sufficient to oligomerize aromatic amines contained therein, and then reacting said bottoms residue containing oligomerized amines with a benzylhalide at a temperature and for a time sufficient to form said mixture of quaternary ammonium compounds; and contacting said metal surface with said aqueous acid solution containing said corrosion inhibitor.

18. The method of claim 16 wherein said aqueous acid solution contains an acid selected from the group consisting of hydrochloric acid, hydrofluoric acid, formic acid, acetic acid, citric acid and mixtures thereof present in said aqueous acid solution in an amount in the range of from about 2% to about 100% by weight of water in said solution.

19. The method of claim 18 wherein said metal corrosion inhibitor is combined with said aqueous acid solution in an amount in the range of from about 0.05% to about 3% by volume of said solution.

20. The method of claim 17 wherein said catalyst is cuprous chloride present in said bottoms residue in an amount in the range of from about 0.1% to about 2% by weight of said bottoms residue.

21. The method of claim 20 wherein said bottoms residue is contacted with said oxygen at a rate in the range of from about 2 to about 30 cubic centimeters per minute per 100 milliliters of bottoms residue at a temperature in the range of from about 150° F. to about 225° F. and for a time period in the range of from about 8 hours to about 48 hours.

22. The method of claim 21 wherein said bottoms residue containing oligomerized amines is reacted with said benzylhalide in an amount in the range of from about 70% to about 100% by weight of said bottoms residue at a temperature period in the range of from about 8 hours to about 48 hours.

* * * * *